United States Patent
Obara et al.

(10) Patent No.: US 6,794,774 B2
(45) Date of Patent: Sep. 21, 2004

(54) SPINDLE MOTOR

(75) Inventors: Rikuro Obara, Miyota-machi (JP); Hiroshi Yoshikawa, Miyota-machi (JP)

(73) Assignee: Minebea Kabushiki-Kaisha, Nagano-ken (JP)

( * ) Notice: Subject to any disclaimer, the term of this patent is extended or adjusted under 35 U.S.C. 154(b) by 51 days.

(21) Appl. No.: 10/316,829

(22) Filed: Dec. 12, 2002

(65) Prior Publication Data

US 2003/0094870 A1 May 22, 2003

Related U.S. Application Data

(62) Division of application No. 09/795,490, filed on Mar. 1, 2001, now Pat. No. 6,512,316.

(30) Foreign Application Priority Data

Mar. 16, 2000 (JP) .......................................... 2000-74064

(51) Int. Cl.[7] .............................. H02K 5/24; H02K 7/14; H02K 7/08; H02K 11/00
(52) U.S. Cl. ..................... 310/67 R; 310/90; 360/99.08; 384/504
(58) Field of Search ................................ 310/67 R, 90, 310/91; 360/97.01, 98.07, 99.04, 99.08, 99.12; 384/504, 512–513, 516–517, 537; 29/898.07

(56) References Cited

U.S. PATENT DOCUMENTS

| | | | |
|---|---|---|---|
| 3,651,550 A | 3/1972 | Bennett | .................. 29/898.09 |
| 5,138,209 A * | 8/1992 | Chuta et al. | ............... 310/67 R |
| 5,510,661 A * | 4/1996 | Yoshimura et al. | ........... 310/90 |
| 5,808,388 A | 9/1998 | Obara | .......................... 310/90 |
| 5,952,753 A | 9/1999 | Obara | .......................... 310/90 |
| 5,967,671 A | 10/1999 | Obara | ........................ 384/504 |
| 6,010,247 A | 1/2000 | Mouri et al. | ................. 384/517 |
| 6,246,137 B1 * | 6/2001 | Obara | .......................... 310/90 |
| 6,309,109 B1 | 10/2001 | Chuang | ...................... 384/537 |
| 6,316,855 B1 * | 11/2001 | Moosmann et al. | .......... 310/71 |

* cited by examiner

Primary Examiner—Tran Nguyen
(74) Attorney, Agent, or Firm—Israel Gopstein

(57) ABSTRACT

A spindle motor of the present invention is capable of keeping its ball (5a, 5b)'s pre-load constant, because a sleeve (6) is capable of being resiliently deformed due to its resiliency, and therefore capable of constantly keeping a pre-load applied to the balls (5a, 5b) from inner and inner ring raceways of inner and outer rings (3a, 4a, 3b, 4b) of ball bearings (3, 4). In this motor, a rotor hub (7) has an axial center bore (8). This bore (8) is provided with: a large-diameter bore portions in its opposite axial ends; and, a small-diameter bore portion (8a) axially interposed between the large-diameter bore portions. An inner diameter of the small-diameter bore portion (8a) is smaller than an outer diameter of the sleeve (6). The axial center bore (8) of the hub (7) is fitted to an outer peripheral surface of the sleeve (6) in an insertion manner through a heating shrinkage fit process, so that the sleeve (6) is subjected to a radially inwardly exerted pressure applied from outside to resiliently deform radially inwardly. As a result, a small-diameter portion (6a) is formed in the sleeve (6) to extend radially inwardly between the outer rings (3b, 4b).

4 Claims, 2 Drawing Sheets

SPINDLE MOTOR

This application is a division of Application Ser. No. 09/795,490, filed Mar. 1, 2001, now U.S. Pat. No. 6,512,316.

BACKGROUND OF THE INVENTION

1. Field of the Invention

The present invention relates to a spindle motor suitable for use in a rotary drive unit, wherein the rotary drive unit is used in office automation equipment such as computers and the like, and in their peripheral equipment as well.

2. Description of the Related Art

As shown in FIG. 4, a conventional spindle motor, which serves as a magnetic disk drive component in a hard disk drive unit (one of computer peripheral equipments), has a construction in which: an upright shaft 42 has its base portion fixedly mounted in a base 41; and, a rotor hub 43 forming a rotating member of the motor is rotatably mounted on the upright shaft 42 through a pair of an upper ball bearing 44 and a lower ball bearing 45, inner rings 44a, 45a of which bearings 44, 45 are axially spaced apart from each other, wherein the inner rings 44a and 45a belong to the upper ball bearing 44 and the lower ball bearing 45, respectively, and have conventional steel balls 48a and 48b interposed between the inner rings 44a, 45a and their corresponding outer rings 44b, 45b, respectively; these ball bearing 44 and 45 have their outer rings 44b and 45b fitted in a sleeve 46, respectively; the sleeve 46 is fitted in an axial center bore 47 of the rotor hub 43; and, the ball bearings 44, 45 have their inner rings 44a, 45a or their outer rings 44b, 45b bonded to the upright shaft 42 or to the sleeve 46 using an appropriate adhesive or like fastening means in a condition in which the inner ring 44a or the outer ring 44b of the upper ball bearing 44 is appropriately pressed from above in a manner such that the balls 48a, 48b are brought into press-contact with both the inner and the outer rings of these ball bearings 44, 45.

When the spindle motor is energized, a temperature of the motor goes up so that its individual components thermally expand at various expansion amounts. The relationship in thermal expansion amount in radial direction of these components of the ball bearings 44, 45 is as follows: outer rings>inner rings>balls.

Consequently, when the temperature of the spindle motor goes up, a radial space or clearance between the inner ring and the corresponding outer ring in each of the ball bearings 44, 45 increases. On the other hand, since the balls 48a, 48b are smaller in thermal expansion amount than the inner and the outer rings, a pre-load applied to each of the balls 48a, 48b by the inner and the outer rings is reduced, which results in variations in resonant frequency of the motor, and often results in the generation of the resonant vibration of the motor with a structural member to which the motor is mounted.

For example, in case that the conventional motor is used as a drive component of the hard disk drive unit, there is a fear that the conventional motor resonates to the structural member such as a swing arm, a casing and the like to impair the hard disk drive unit in accuracy in data reading and writing operations due to the drive unit's vibration and also to impair the hard disk drive unit in quietness in operation due to noises caused by the drive unit's vibration.

On the other hand, when differences in thermal expansion amount between the inner rings and the outer rings of the ball bearings 44, 45 further increase, too much play appears between the balls and each of the inner and the outer rings, which causes considerable vibrations in rotation of the rotor hub 43. Such vibrations of the rotor hub 43 cause a recording surface of the magnetic disk to vibrate in axial direction and considerably impairing the hard disk drive unit in reliability in operation.

Particularly, when the balls 48a, 48b are made of ceramics in order to improve the hard disk drive unit in reliability, the above-mentioned problem caused by the differences in thermal expansion amount among the individual components of the ball bearings becomes more serious, because the ceramic balls are much less in thermal expansion amount than the conventional steel balls.

SUMMARY OF THE INVENTION

It is an object of the present invention to provide a spindle motor, which is capable of keeping high rotation accuracies and having its inner and its outer rings brought into appropriate press-contact with its balls even when a temperature of the motor goes up to permit individual components of the motor to thermally expand at various expansion amounts, and further capable of being free from variations in resonant frequency and also free from vibrations in rotation.

In accordance with a first aspect of the present invention, the above object of the present invention is accomplished by providing:

In a spindle motor comprising: a first upright shaft fixedly mounted on abase; a pair of a first upper ball bearing and a first lower ball bearing both rotatably mounted on the first upright shaft and provided with a plurality of first balls between their first inner rings and their first outer rings; a first sleeve fitted to outer peripheral surfaces of the first outer rings; and, a rotor hub mounted on an outer peripheral surface of the first sleeve so that the rotor hub is rotatably supported on the base, the improvement wherein:

the rotor hub is provided with an axial center bore;

the axial center bore is provided with a pair of large-diameter bore portions in its opposite axial end portions together with a small-diameter bore portion which is axially interposed between the large-diameter bore portions;

an inner diameter of the small-diameter bore portion is smaller than an outer diameter of the first sleeve;

the axial center bore of the rotor hub is fitted to an outer peripheral surface of the first sleeve in an insertion manner through a heating shrinkage fit process, so that the first sleeve is subjected to a radially inwardly exerted pressure applied from outside to the first sleeve to deform resiliently radially inwardly;

whereby a small-diameter portion is formed in the first sleeve to extend radially inwardly between the first outer rings of the first upper ball bearing and the first lower ball bearing.

In the spindle motor of the present invention having the above construction, preferably, an annular groove is formed in an inner peripheral surface of the first sleeve in an axial position in which each of the first outer rings of the ball bearings is brought into contact with the inner peripheral surface of the first sleeve; and, the annular groove is substantially equal in axial width to an outer ring raceway of each of the first outer rings, wherein the outer ring raceway is formed in an inner peripheral surface of each of the outer rings.

In accordance with a second aspect of the present invention, the above object of the present invention is accomplished by providing:

In a spindle motor comprising: a stepped shaft i.e., a two-diameter shaft, provided with a large-diameter portion and a small-diameter portion; a second sleeve which surrounds the stepped shaft and provided with a pair of an upper outer ring raceway and a lower outer ring raceway both arranged parallel to each other in an inner peripheral surface of the second sleeve; an upper row of balls interposed between an upper inner ring raceway and the upper outer ring raceway of the second sleeve, wherein the upper inner ring raceway is formed in an outer peripheral surface of an inner ring which is fitted to the small-diameter portion of the stepped shaft in an insertion manner; a lower row of balls interposed between a lower inner ring raceway and the lower outer ring raceway which is formed in a lower portion of the inner peripheral surface of the second sleeve, wherein the lower inner ring raceway is formed directly in an outer peripheral surface of the large-diameter portion of the stepped shaft; the second sleeve, the balls, the inner ring and the stepped shaft are combined with each other to form a compound bearing assembly, wherein a base portion of the large-diameter portion of the stepped shaft in the compound bearing assembly is uprightly and fixedly mounted in a base; and, a rotor hub mounted on an outer peripheral surface of the second sleeve so that the rotor hub is rotatably supported on the base, the improvement wherein:

the rotor hub is provided with an axial center bore;

the axial center bore is provided with a pair of large-diameter bore portions in its opposite axial end portions together with a small-diameter bore portion which is axially interposed between the large-diameter bore portions;

an inner diameter of the small-diameter bore portion is smaller than an outer diameter of the second sleeve;

the axial center bore of the rotor hub is fitted to an outer peripheral surface of the second sleeve in an insertion manner through a heating shrinkage fit process, so that the second sleeve is subjected to a radially inwardly exerted pressure applied from outside to the second sleeve to deform resiliently radially inwardly;

whereby a small-diameter portion is formed in the second sleeve to extend radially inwardly between the upper outer ring raceway and the lower outer ring raceway of the second sleeve.

In the spindle motor of the present invention having the above construction, preferably: the inner ring is equal in an outer diameter to the large-diameter portion of the stepped shaft; and, the balls of the upper row thereof are equal in a ball diameter to the balls of the lower row thereof.

Further, preferably, the balls are made of ceramics.

The spindle motor of the present invention has the following effects: namely

In the spindle motor of the present invention, the small-diameter portion is formed in an axially intermediate portion of each of the first and the second sleeve, for example: by radially inwardly pressing the first sleeve's intermediate portion between the opposite axial end portions of the first sleeve which surrounds the upper and the lower outer ring; or, by radially inwardly pressing the second sleeve's axially intermediate portion between the upper and the lower outer ring raceway of the second sleeve which serves as a common outer ring of the compound ball bearing assembly. Consequently, when a temperature of the spindle motor goes up due to its energization, the individual components of the spindle motor thermally expand at various expansion amounts to increase a space or clearance between the inner ring raceway and the outer ring raceway in each of the upper and the lower ball bearings or in each of the upper and the lower ball bearing portions of the compound ball bearing assembly. However, even when the clearance between the inner ring raceway and the outer ring raceway increases, it is possible for the spindle motor of the present invention to keep its ball's pre-load constant, because each of the first and the second sleeve is capable of being resiliently deformed due to its resiliency, and therefore capable of keeping constant a pressure applied from each of the inner and the outer ring raceway to the balls.

Consequently, it is possible for the spindle motor of the present invention to keep its accuracy in rotation at high levels in a steady manner even when the spindle motor has its temperature increased in operation. Further, it is also possible for the spindle motor of the present invention to substantially prevent its resonant frequency from varying, which prevents the motor from vibrating in rotation, and therefore prevents noises from being generated in the motor in operation due to the vibrations created by the motor.

Further, in the second sleeve provided with the outer ring raceways in its inner peripheral surface, it is possible for the balls of the compound ball bearing assembly to keep their rotation in a steady manner, because the provision of the outer ring raceways in the second sleeve may spread the ball's load more evenly even when the balls are subjected to excessive loads applied by the outer ring raceways of the second sleeve due to thermal deformations of the second sleeve and the rotor hub.

Still further, when the balls are made of ceramics it is possible to remarkably improve such ceramic balls in durability in comparison with the ordinary steel balls, which leads to a remarkable improvement of the spindle motor of the present invention in service life.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Figure 1:
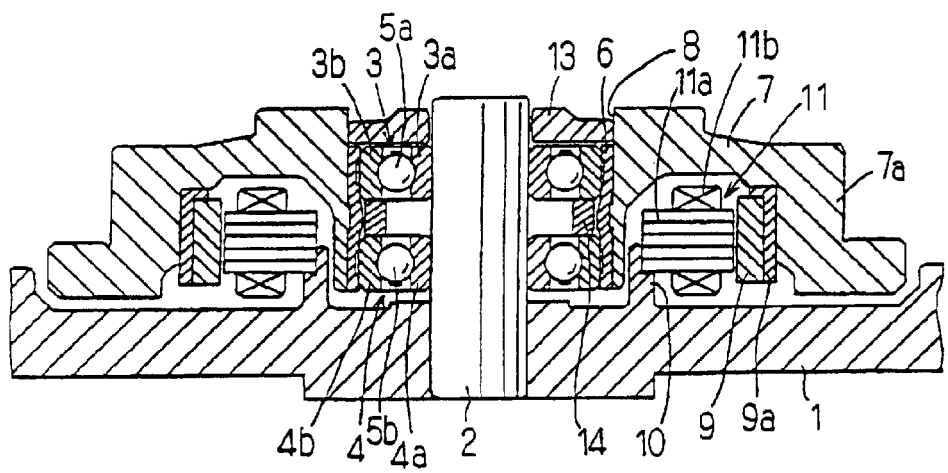
FIG. 1 is a longitudinal sectional view of a first embodiment of a spindle motor of the present invention.

The best modes for carrying out the present invention will be described in detail using embodiments of the present invention with reference to the accompanying drawings.

The present invention may, however, be embodied in various different forms and should not be construed as limited to the embodiments set forth herein; rather, these embodiments are provided so that this disclosure will be thorough and complete, and will fully convey the scope of the present invention to those skilled in the art.

In the accompanying drawings, the thickness of each of spindle motor's components and portions are exaggerated for clarity. Like reference numerals refer to like parts throughout the drawings.

First Embodiment

Figure 2:
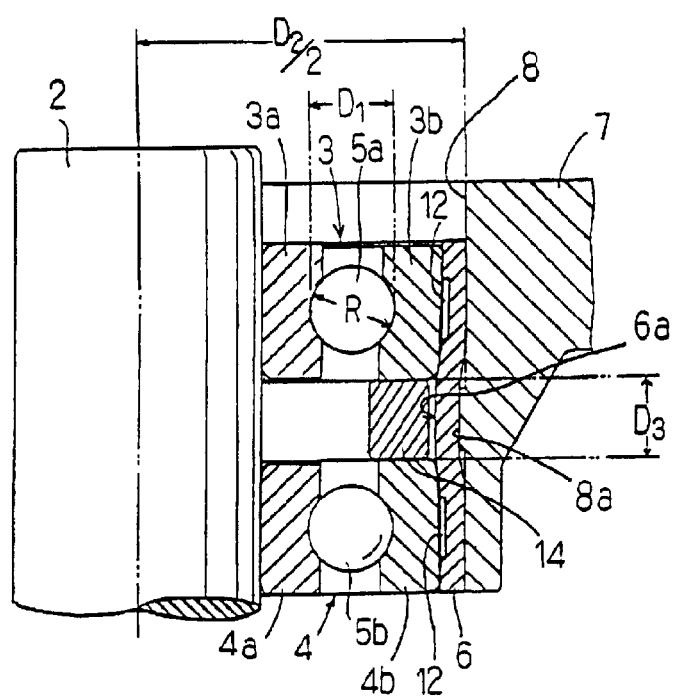
FIG. 2 is an enlarged longitudinal sectional view of an essential part of the spindle motor of the present invention shown in FIG. 1.

As shown in FIGS. 1 and 2, in a first embodiment of a spindle motor of the present invention, a first upright shaft 2 has its lower end portion fixedly mounted in a base 1.

On the other hand, as is clear from FIG. 1, a first upper ball bearing 3 and a first lower ball bearing 4 have an upper row of balls 5a and a lower row of balls 5b thereof interposed between: an upper inner rings 3a and an upper outer ring 3b; and, a lower inner ring 4a and a lower outer ring 4b, respectively.

Incidentally, these balls 5a, 5b are made of ceramics to serve as rolling elements interposed between the inner rings and the outer rings of the ball bearings 3, 4. Each of the inner rings 3a, 4a of these ball bearings 3, 4 is mounted on the first upright shaft 2 in an insertion manner, and spaced apart from each other through a collar or spacer 14 axially interposed between the upper outer ring 3b and the lower outer ring 4b of the ball bearings 3, 4. Each of these outer rings 3b, 4b is mounted in a first sleeve 6 in an insertion manner, and axially spaced apart from each other through the spacer 14 as is in the inner rings 3a, 4a.

Mounted on peripheral surfaces of these outer rings 3b, 4b and bonded thereto is an axial center bore 8 of a rotating member forming a rotor hub 7.

As is clear from FIG. 1, the rotor hub 7 is provided with a downward flange 7a in its outer peripheral portion. Fixedly mounted on an inner peripheral surface of the downward flange 7a of the rotor hub 7 through a magnet holder 9a is a permanent magnet 9. This magnet 9 has its inner peripheral surface oppositely disposed from and spaced apart from an outer peripheral surface of a laminated core 11a of a stator assembly 11. This stator assembly 11 is fixedly mounted on a cylindrical stator holder 10. As is clear from FIG. 1, this stator holder 10 is integrally formed with the base 1 to extend upward from the base 1.

On the other hand, the axial center bore 8 of the rotor hub 7 is provided, in its inner peripheral surface, with an upper large-diameter bore portion and a lower large-diameter bore portion in its opposite axial end portions; and, a small-diameter bore portion 8a interposed between these upper and lower large-diameter bore portions. An inner diameter of each of these upper and lower large-diameter bore portions is substantially equal to or larger than an outer diameter of the first sleeve 6.

As for an inner diameter of the small-diameter bore portion 8a of the rotor hub 7, this inner diameter is smaller than the outer diameter of the first sleeve 6 so that the first sleeve 6 is subjected to a resiliently radially inwardly applied pressure exerted from outside by the small-diameter bore portion 8a of the rotor hub 7.

Due to the presence of this radially inwardly applied pressure exerted from outside, as shown in FIG. 2, a reduced or small-diameter portion 6a is resiliently formed in an axially intermediate portion of an inner peripheral surface of the first sleeve 6, which intermediate portion corresponds in axial position to the spacer 14 to resiliently radially inwardly extend, wherein the intermediate portion of the first sleeve 6 is interposed between the outer rings 3b and 4b of the first upper and first lower ball bearings 3, 4, as described above.

Incidentally, the inner diameter of the small-diameter bore portion 8a of the rotor hub 7 is determined on the basis of material properties of both the fist sleeve 6 and the rotor hub 7; and, maximum allowable temperature of the spindle motor in operation, provided that deformation in the small-diameter portion 6a of the first sleeve 6 is substantially within the elastic limit of the material of the first sleeve 6.

Further, the first sleeve 6 is provided with a pair of an upper and a lower annular groove 12 in its inner peripheral surface in axial positions in which the first outer rings 3b, 4b of the ball bearings 3, 4 are brought into contact with the inner peripheral surface of the first sleeve 6. Each of the upper and the lower annular groove 12 is substantially equal in axial width to an outer ring raceway of each of the first outer rings 3b, 4b, wherein each of the outer ring raceways is formed in an inner peripheral surface of each of the outer rings 3b, 4b. These outer rings 3b, 4b are axially spaced apart from each other through the spacer 14.

Figure 3:
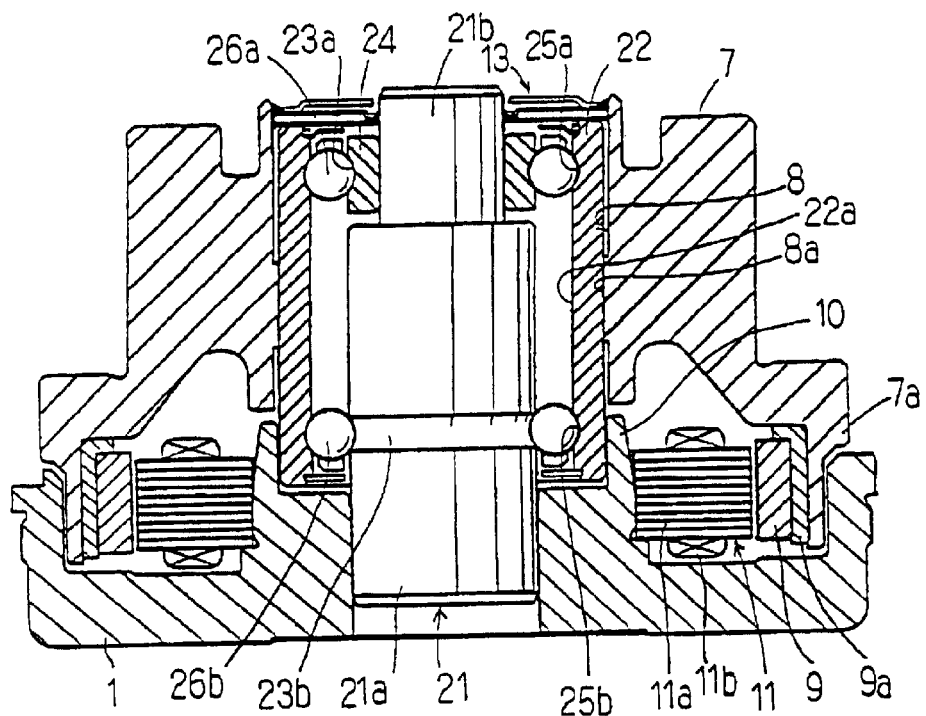
FIG. 3 is a longitudinal sectional view of a second embodiment of a spindle motor of the present invention.
Figure 4:
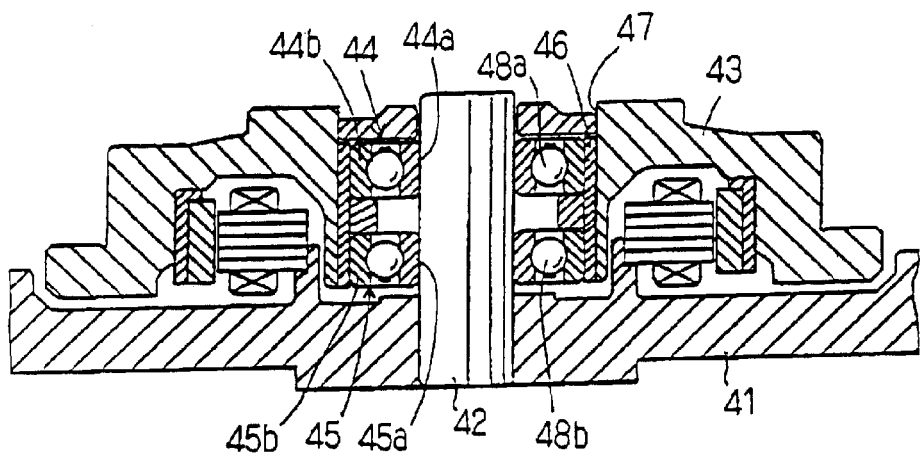
FIG. 4 is a longitudinal sectional view of a conventional spindle motor.

Incidentally, in FIGS. 1 to 3: the reference numeral 11a denotes a stator core (i.e., the above-mentioned laminated core); 11b denotes a motor coil; 13 denotes a sealing element; and, 14 denotes the spacer interposed between the upper outer ring 3b and the lower outer ring 4b of the ball bearings 3, 4.

In the spindle motor having the above construction, the rotor hub 7 is fixedly mounted on the first sleeve 6 in an insertion manner through the heating shrinkage fit process. More specifically, in the first embodiment, the ball bearings 3, 4 are inserted into opposite axial upper and lower end straight cylindrical portions of the first sleeve 6, and have their outer rings 3b and 4b fixedly bonded to the corresponding opposite axial upper and lower end straight cylindrical portions of the first sleeve 6, respectively. After that, the rotor hub 7 is thermally expanded by heating, so that an inner diameter of the small-diameter bore portion 8a of the axial center bore 8 of the rotor hub 7 is increased to a value substantially larger than an outer diameter of the first sleeve 6, whereby the first sleeve 6 is inserted into the axial center bore 8 of the rotor hub 7 in a manner such that the small-diameter bore portion 8a of the rotor hub 7 is radially adjacent to the spacer 14 through the intermediate portion of the first sleeve 6, wherein such intermediate portion of the first sleeve 6 is axially disposed between the outer rings 3b and 4b of the ball bearings 3, 4, as shown in FIG. 2. Under such circumstances, the rotor hub 7 is cooled to permit its axial center bore 8 to become narrower in diameter around the first sleeve 6. Due to such shrinkage in diameter of the axial center bore 8 of the rotor hub 7 around the first sleeve 6, the first sleeve 6 is fixed to the axial center bore 8 of the rotor hub 7.

At this time, as is clear from FIG. 2, a reduced- or small-diameter portion 6a is formed in a substantially axially intermediate portion of the first sleeve 6 since such intermediate portion of the first sleeve 6 is resiliently radially inwardly pressed from outside by the small-diameter bore portion 8a of the rotor hub 8 in an axial position between the outer rings 3b and 4b of the first upper and first lower ball bearings 3, 4 due to the above-mentioned shrinkage in diameter of the axial center bore 8 of the rotor hub 7. As a result, a lower one of the opposite axial end portions of the first sleeve 6 is axially pulled up toward the small-diameter portion 6a so that the entire axial length of the first sleeve 6 is reduced, whereby an axial clearance between the outer rings 3b and 4b of the ball bearings 3, 4 is also reduced.

After that, the first upright shaft 2 is inserted into the inner rings 3a, 4a of the ball bearings 3, 4. Then, the lower inner ring 4a is fixed to the first upright shaft 2 by bonding and like fastening means. After that, the upper inner ring 3a is fixed to the first upright shaft 2 by bonding and like fastening means in a condition in which the upper inner ring 3a is appropriately pre-loaded from above.

Next, the spindle motor having the above construction will be described in operation.

When the motor coil 11b of the stator assembly 11 is energized, the rotor hub 7 is rotatably driven about a longitudinal axis of the first upright shaft 2.

When a temperature of the spindle motor goes up due to such energization of the motor coil 11b, the individual components of the spindle motor are thermally expanded at various expansion amounts. At this time, the inner diameters of the outer rings 3b, 4b are larger in thermal expansion amount than the outer diameters of the inner rings 3a, 4a in the ball bearings 3, 4. Due to this, as shown in FIG. 2, a radial space or clearance $D_1$ between the bottom of the inner ring raceway of each of the inner rings 3a, 4a; and, the corresponding bottom of the outer ring raceway of each of the outer rings 3b, 4b is increased. In this case, further a thermal expansion amount in a diameter R of each of the balls 5a, 5b is smaller than that in a diameter of each of the inner and the outer rings. Consequently, when the ball bearings 3, 4 are heated and thermally expanded, these bearing 3, 4 are deformed in a manner such that the pre-load applied to each of the balls 5a, 5b is reduced, through which pre-load the balls 5a, 5b are brought into contact with the inner and the outer ring raceways of the inner and the outer rings 3a, 4a and 3b, 4b.

On the other hand, as shown in FIG. 2, since the inner diameter $D_2$ of the axial center bore 8 of the rotor hub 7 is larger in thermal expansion amount than an outer diameter of the first sleeve 6, a pressure applied to the first sleeve 6 through the small-diameter bore portion 8a of the rotor hub 7 is reduced when the temperature of the spindle motor goes up. Such pressure reduction in the first sleeve 6 increases the tendency of the first sleeve 6 to resiliently return to its original straight cylindrical shape due to its resiliency, which reduces the amount of the small-diameter portion 6a radially inwardly projecting from the remaining portion of the first sleeve 6 to permit the first sleeve 6 to extend in its axial direction. Due to such increase in axial direction of the first sleeve 6, an axial space or clearance $D_3$ between the outer rings 3b and 4b of the ball bearings 3, 4 increases, which increases an axial clearance between the outer ring raceway of the upper outer ring 3b and that of the lower outer ring 4b to result in an increase in pre-load of each of the balls 5a, 5b applied through the inner and the outer rings 3a, 4a, 3b, 4b.

Consequently, when the pre-load of each of the balls 5a, 5b is reduced by increasing a radial clearance $D_1$ between: each of the inner rings 3a, 4a; and, each of the outer rings 3b, 4b, it is possible to solve the above-mentioned excessive pre-load problem caused by the increase in the axial clearance $D_3$ between the upper outer ring 3b and the lower outer ring 4b, which makes it possible to keep the pre-load of each of the balls 5a, 5b at a reasonable constant value even when the temperature of the spindle motor goes up in operation.

Further, in this first embodiment, since the fist sleeve 6 is provided with the upper and the lower annular grooves 12 in its inner peripheral surface, it is possible for the outer rings 3b, 4b to always apply the above-mentioned reasonable constant pre-load to each of the balls 5a, 5b since the outer ring raceways of the outer rings 3b, 4b are free from any excessive pressure even when the first sleeve 6 is pressed from outside by the small-diameter bore portion 8a of the rotor hub 7.

Second Embodiment

In a second embodiment of the spindle motor of the present invention, a compound ball bearing assembly having a unique construction for supporting the rotor hub 7 is employed. Now, a concrete construction of such compound ball bearing assembly used in the second embodiment will be described with reference to FIG. 3.

In FIG. 3: the reference numeral 21 denotes a stepped shaft which is provided with a large-diameter portion 21a and a small-diameter portion 21b; and, the reference numeral 22 denotes a second sleeve, which surrounds the stepped shaft 21 to form a common outer ring of the compound ball bearing assembly.

Mounted on the small-diameter portion 21b of the stepped shaft 21 is an inner ring 24. This inner ring 24 is provided with an inner ring raceway 23a, which 23a is brought into press-contact with an upper row of balls 26a. On the other hand, directly formed in an outer peripheral surface of the large-diameter portion 21a of the stepped shaft 21 is an inner ring raceway 23b, which 23b is brought into press-contact with a lower row of balls 26b.

As shown in FIG. 3, the second sleeve 22 is provided with an upper outer ring raceway 25a and a lower outer ring raceway 25b, and serves as a common outer ring of the compound ball bearing assembly, wherein the raceways 25a, 25b are arranged in parallel to each other and axially spaced apart from each other. An upper row of the balls 26a is radially interposed between: the upper outer ring raceway 25a of the second sleeve 22; and, the inner ring raceway 23a of the inner ring 24. On the other hand, a lower row of the balls 26b is radially interposed between the inner ring raceway 23b of the large-diameter portion 21a of the stepped shaft 21; and, the lower outer ring raceway 25b of the second sleeve 22.

In the second embodiment, both the balls 26a, 26b are made of ceramics. Further, the inner ring 24 is equal in an outer diameter to the large-diameter portion 21a of the stepped shaft 21. All the balls 26a, 26b are equal in an outer diameter to each other.

In the spindle motor of this second embodiment, since the compound ball bearing assembly having the above construction is employed, the conventional ball bearing assemblies each constructed of an inner ring and an outer ring are not required. In addition to the above, since the second sleeve 22 serves as a pair of outer rings (i.e., common outer ring of the compound ball bearing assembly), the compound ball bearing assembly used in the second embodiment may reduce the number of its components in comparison with the corresponding pair of the conventional ball bearing assemblies. Further, the compound ball bearing assembly used in the second embodiment permits the large-diameter portion 21a of the stepped shaft 21 to increase its outer diameter, and also permits the small-diameter portion 21b to increase its outer diameter since the inner ring 24 mounted on this small-diameter portion 21b requires no outer ring. In other words, in the second embodiment, as is clear from FIG. 3, the small-diameter portion 21b of the stepped shaft 21 may increase in outer diameter by a value corresponding to a radial wall thickness of an outer ring of a conventional ball bearing assembly in which an inner ring radially oppositely disposed from and spaced apart from the outer ring is equal to the inner ring 24. Due to this, in the second embodiment, it is possible for the stepped shaft 21 to have each of its small-diameter portion 21b and its large-diameter portion 21a increased in outer diameter as a whole, which improves the stepped shaft 21 in rigidity and in reliability.

Due to this, the stepped shaft 21 used in the second embodiment is excellent in rigidity and in reliability, further may be substantially prevented from vibrating in rotation, and is therefore excellent in quietness in operation.

Incidentally, as for the remaining construction of the second embodiment of the spindle motor, the second embodiment shown in FIG. 3 is the same as that of the first embodiment shown in FIGS. 1 and 2.

In assembling the above-mentioned components into the second embodiment of the spindle motor, first, as shown in FIG. 3, the inner ring 24 is mounted on the small-diameter portion 21b of the stepped shaft 21 from above in an insertion manner so as to be axially slidable relative to the stepped shaft 21. Then, both the second sleeve 22 and the balls 26a, 26b in the upper and the lower row are assembled on or around the stepped shaft 21.

After that, by a heating shrinkage fit process, the rotor hub 7 has its axial center bore 8 press-fitted to an outer peripheral surface of the second sleeve 22 in an axial position corresponding to a substantially axially intermediate or central portion of an outer peripheral surface of the second sleeve 22. When the rotor hub 7 is cooled to permit its axial center bore 8 to shrink or contract in diameter, such contraction in diameter of the axial center bore 8 has the rotor hub 7 fixed to the second sleeve 22.

During the above contraction in diameter of the axial center bore 8 of the rotor hub 7 on the second sleeve 22, as shown in FIG. 3, the reduced- or small-diameter portion 22a is formed in a substantially axially intermediate portion of the second sleeve 22 under the influence of a radially inwardly directed pressure applied from outside to an outer peripheral surface of the above axially intermediate portion by means of the small-diameter bore portion 8a of the rotor hub 7. At this time, the second sleeve 22 has its upper and lower portions axially pulled toward the intermediate portion of the second sleeve 22 due to formation of the small-diameter portion 22a in the intermediate portion, wherein the small-diameter portion 22a extends radially inwardly from the remaining portion (i.e., the upper and the lower portion) of the second sleeve 22. Due to this, the entire axial length of the second sleeve 22 is reduced, which reduces the axial space or clearance between the upper outer ring raceway 25a and the lower outer ring raceway 25b.

Incidentally, as is in the first embodiment shown in FIGS. 1 and 2, also in this second embodiment shown in FIG. 3, the small-diameter bore portion 8a of the rotor hub 7 is determined in its inner diameter on the basis of material properties of each of the sleeve 22 (second one) and the rotor hub 7 together with the allowable maximum level of temperature in the spindle motor in operation in a manner such that the amount of deformation of the reduced- or small-diameter portion 22a formed in the second sleeve 22 is within the elastic limit of the material of the second sleeve 22.

After that, the inner ring 24 is mounted on the small-diameter portion 21b of the stepped shaft 21 from above in an insertion manner in a condition in which an appropriate amount of pre-load is applied downwardly to the upper end surface of the inner ring 24. The inner ring 24 thus mounted on the small-diameter portion 21b of the stepped shaft 21 is then bonded to the small-diameter portion 21b using a suitable adhesive.

Also in this second embodiment, when the temperature of the spindle motor goes up in operation, the individual components of the spindle motor are also thermally expanded at various expansion amounts. More specifically, the inner diameter portion of the second sleeve 22 is thermally expanded at an expansion amount larger than that of an outer diameter portion of each of the stepped shaft 21 and the inner ring 24, which increases the radial space or clearance between: the inner ring 24 mounted on the stepped shaft 21; and, the second sleeve 22 to reduce the amount of pre-load applied on each of the balls 26a, 26b, because each of these balls 26a, 26b is smaller in thermal expansion amount than each of the stepped shaft 21 and the inner ring 24.

On the other hand, since the inner diameter portion of the rotor hub 7 is larger in thermal expansion amount than the outer diameter portion of the second sleeve 22, it is possible to reduce a radial pre-load applied on the second sleeve 22 from outside through the small-diameter portion 8a of the rotor hub 7. Such reduction in the radial pre-load applied on the second sleeve 22 from outside increases the tendency of the second sleeve 22 to return to its original straight cylindrical shape. As a result, the second sleeve 22 is axially extended in length, which increases the axial clearance between the upper outer ring raceway 25a and the lower outer ring raceway 25b of the second sleeve 22. Such increase in the axial clearance between these outer ring raceways 25a and 25b decreases a radial clearance between: each of the inner ring raceways 23a, 23b; and, the corresponding one of the outer ring raceways 25a, 25b, and, therefore increases the amount of pre-load applied to each of the balls 26a, 26b.

In summary, reduction in the pre-load applied to each of the balls 26a, 26b resulted from increase in the radial clearance between the inner ring 24 and the second sleeve 22 is offset by increase in the pre-load applied to each of the balls 26a, 26b resulted from increase in the axial clearance between the outer ring raceways 25a and 25b, which makes it possible to keep the pre-load of each of the balls 26a, 26b at an appropriate level even when the temperature of the spindle motor goes up in operation.

Incidentally, although the balls 5a, 5b, 26a, 26b are made of ceramics to improve the spindle motor of the present invention in reliability in the first and the second embodiment, it is also possible for the spindle motor of the present invention to use balls made of steels, or like suitable materials.

Finally, the present application claims the Convention Priority based on Japanese Patent Application No. 2000-074064 filed on Mar. 16, 2000, which is herein incorporated by reference.

What is claimed is:

1. In a spindle motor comprising: a stepped shaft (21) provided with a large-diameter portion (21a) and a small-diameter portion (21b); a second sleeve (22) which surrounds said stepped shaft (21) and provided with a pair of an upper outer ring raceway (25a) and a lower outer ring raceway (25b) both arranged parallel to each other and axially spaced apart from each other in an inner peripheral surface of said second sleeve (22); an upper row of balls (26a) radially interposed between an upper inner ring raceway (23a) and said upper outer ring raceway (25a) of said second sleeve (22), wherein said upper inner ring raceway (23a) is formed in an outer peripheral surface of an inner ring (24) which is fitted to said small-diameter portion (21b) of said stepped shaft (21) in an insertion manner; a lower row of balls (26b) radially interposed between a lower inner ring raceway (23b) and said lower outer ring raceway (25b) which is formed in a lower portion of said inner peripheral surface of said second sleeve (22), wherein said lower inner ring raceway (23b) is formed directly in an outer peripheral surface of said large-diameter portion (21a) of said stepped shaft (21); said second sleeve (22), said balls (26a, 26b), said inner ring (24) and said stepped shaft (21) are combined with each other to form a compound bearing assembly, wherein a base portion of said large-diameter portion (21a) of said compound bearing assembly is uprightly and fixedly mounted in a base (1); and, a rotor hub (7) which is mounted on an outer peripheral surface of said second sleeve (22) so that said rotor hub (7) is rotatably supported on said base (1), wherein an improvement of said spindle motor comprising:

said rotor hub (7) is provided with an axial center bore (8);

said axial center bore (8) is provided with a pair of large-diameter bore portions in opposite axial end portions thereof, together with a small-diameter bore portion (8a) which is axially interposed between said large-diameter bore portions;

an inner diameter of said small-diameter bore portion (8a) is smaller than an outer diameter of said second sleeve (22);

said axial center bore (8) of said rotor hub (7) is fitted to an outer peripheral surface of said second sleeve (22) in an insertion manner through a heating shrinkage fit process, so that said second sleeve (22) is subjected to a radially inwardly exerted pressure applied from outside to said second sleeve (22) to deform resiliently radially inwardly;

wherein a small-diameter portion (22a) is formed in said second sleeve (22) to extend radially inwardly between said upper outer ring raceway (25a) and said lower outer ring raceway (25b) of said second sleeve (22).

2. The spindle motor according to claim 1, wherein: said inner ring (24) is equal in an outer diameter to said large-diameter portion of said stepped shaft (21); and, said balls (26a) of said upper row thereof are equal in a ball diameter to said balls (26b) of said lower row thereof.

3. The spindle motor according to claim 1, wherein said balls (26a, 26b) are made of ceramics.

4. The spindle motor according to claim 2, wherein said balls (26a, 26b) are made of ceramics.

* * * * *